United States Patent
Hepper et al.

(10) Patent No.: US 10,891,423 B2
(45) Date of Patent: Jan. 12, 2021

(54) PORTLET DISPLAY ON PORTABLE COMPUTING DEVICES

(71) Applicant: International Business Machines Corporation, Armonk, NY (US)

(72) Inventors: Stefan A. Hepper, San Jose, CA (US); Jaspreet Singh, Rohini (IN)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 14/220,329

(22) Filed: Mar. 20, 2014

(65) Prior Publication Data
US 2015/0269126 A1 Sep. 24, 2015

(51) Int. Cl.
*G06F 40/134* (2020.01)
*G06F 16/957* (2019.01)
*G06F 40/14* (2020.01)
*H04L 29/08* (2006.01)

(52) U.S. Cl.
CPC ........ *G06F 40/134* (2020.01); *G06F 16/9577* (2019.01); *G06F 40/14* (2020.01); *H04L 67/02* (2013.01)

(58) Field of Classification Search
CPC . G06K 9/00281; G06K 9/00302; G06F 3/012
See application file for complete search history.

(56) References Cited

U.S. PATENT DOCUMENTS

| 7,475,354 B2 | 1/2009 | Guido et al. |
| 2006/0277478 A1* | 12/2006 | Seraji ............ G06F 3/0481 715/760 |
| 2007/0136329 A1 | 6/2007 | Kussmaul et al. |
| 2007/0234206 A1* | 10/2007 | Yamabuchi ....... G06F 17/30905 715/210 |
| 2009/0070713 A1* | 3/2009 | Whitman .............. G06F 3/0481 715/854 |

(Continued)

FOREIGN PATENT DOCUMENTS

WO 2008130388 A2 10/2008

OTHER PUBLICATIONS

Animation and Transitions, Jun. 3, 2014, Windows Dev Center, 1-18.*

(Continued)

*Primary Examiner* — Kavita Stanley
*Assistant Examiner* — Ahmad M El-Bkaily
(74) *Attorney, Agent, or Firm* — Nicholas D. Bowman

(57) ABSTRACT

A portal page may be displayed in the active area of a portable computing device display. The portable computing device may receive display data that includes original page display instructions specifying how to display a plurality of portlets within a common page. The personal computing device may identify an initial portlet of the plurality of portlets and remove portlets, other than the initial portlet, from the original page display instructions to produce modified page display instructions having at least one transition instruction. The personal computing device may scale, based upon the modified page display instructions, the initial portlet to render within the active display area; and render, based upon the scaled initial portlet, a web page within the active display area.

17 Claims, 5 Drawing Sheets

(56) References Cited

U.S. PATENT DOCUMENTS

| | | | | |
|---|---|---|---|---|
| 2009/0089692 | A1* | 4/2009 | Morris | G06F 3/0481 715/764 |
| 2010/0211579 | A1* | 8/2010 | Fujioka | G06Q 30/02 707/754 |
| 2010/0318895 | A1* | 12/2010 | Steinberger | G06F 3/0481 715/234 |
| 2011/0078708 | A1* | 3/2011 | Dokovski | G06F 9/545 719/329 |
| 2011/0299832 | A1* | 12/2011 | Butcher | H04N 21/234318 386/248 |
| 2012/0005620 | A1* | 1/2012 | Tofinetti | G06F 3/0481 715/781 |
| 2012/0047176 | A1 | 2/2012 | Timmons | |
| 2013/0091447 | A1 | 4/2013 | Kang | |
| 2014/0380237 | A1* | 12/2014 | Kroupa | G06F 3/0483 715/803 |

OTHER PUBLICATIONS

Microsoft Corp, Microsoft computer dictionary, 2002, Microsoft Press, 5th edition, p. 44 (Year: 2002).*

Astsatryan, Hrachya, Introduction of a Grtid-Aware Portlet for Numerical Calculations, PDGC, International Confrence on Parallel, Distributed and Grid Computing, pp. 67-70 (Year: 2010).*

Singh, J. et al., "What's New in IBM Rational Application Developer 8.5 Portal Tools," IBM, Nov. 6, 2012, www.ibm.com/developerworks/rational/library/new-rational-application-developer-portal-tools/.

Hepper et al., "Portlet Display on Portable Computing Devices", U.S. Appl. No. 14/606,101, filed Jan. 27, 2015.

Astsatryan et al., "Introduction of a Grid-Aware Portlet for Numerical Calculations", 2010 1st International Conference on Parallel, Distributed and Grid Computing, pp. 67-70.

* cited by examiner

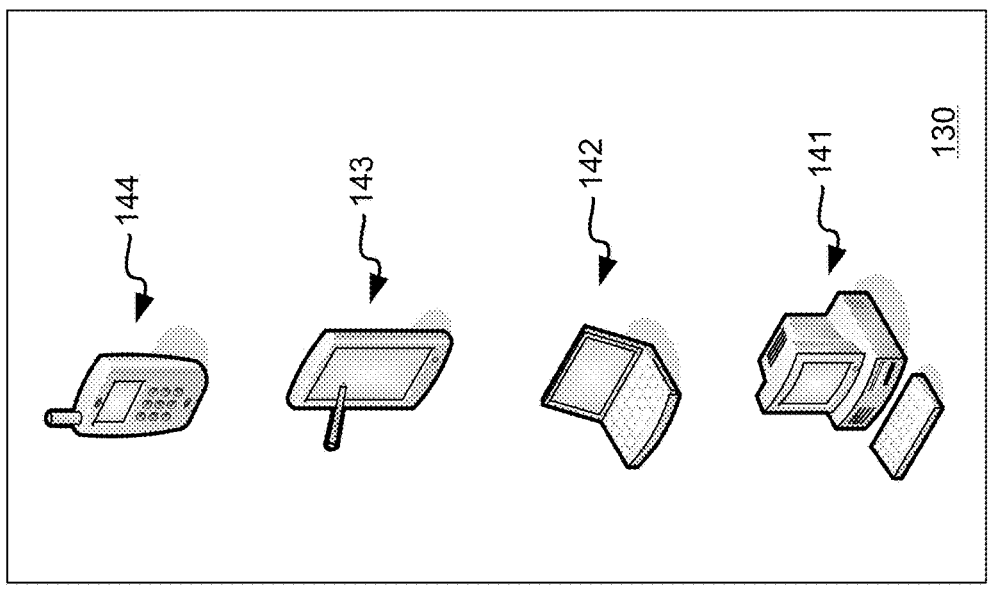
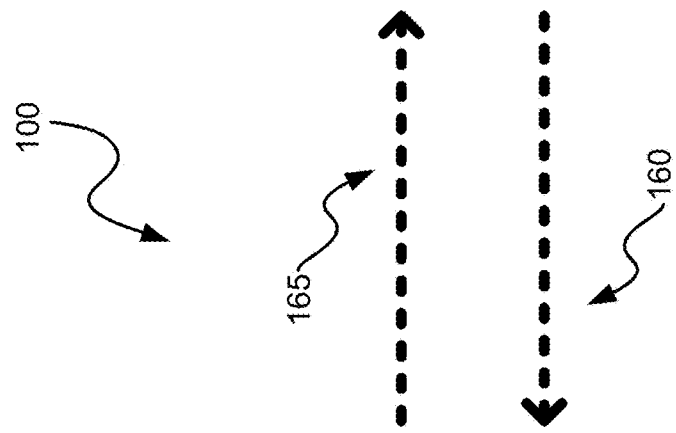
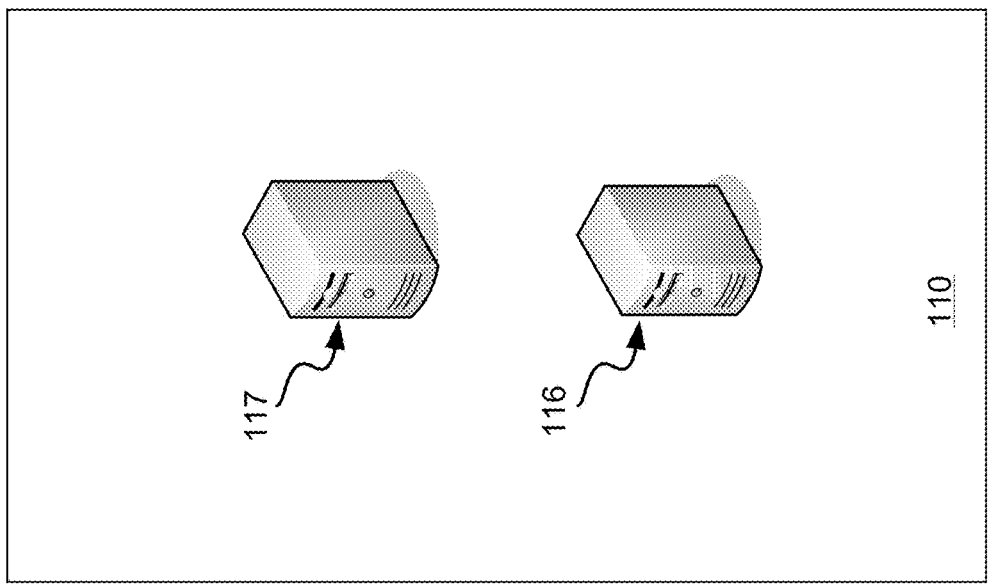
FIG. 1

PORTLET DISPLAY ON PORTABLE COMPUTING DEVICES

BACKGROUND

The present disclosure concerns the display of web page content on internet-connected devices. More specifically, the present disclosure deals with the rendering of the content of web page frames or portlets on mobile devices such as tablet devices and smartphones.

Personal computing devices such as desktop computers, notebook computers, tablet computers and digital telephones may be connected to a computer network. They may request and receive portal pages over the computer network before rendering and displaying portal pages on a display that is part of the personal computing device. Portal pages provided over a computer network may include web page content or page data, as well as page display instructions that regulate the rendering of the portal page content on the computing device display.

SUMMARY

Aspects of the present disclosure may be directed toward a method of displaying a portal page within an active display area. The method may begin by receiving display data that includes original page display instructions specifying how to display a plurality of portlets within a common page. The method may then identify an initial portlet of the plurality of portlets and produce modified page display instructions having at least one transition instruction by removing portlets, other than the initial portlet, from the original page display instructions. The method may scale, based upon the modified page display instructions, the initial portlet to render within the active display area; and render, based upon the scaled initial portlet, a web page within the active display area.

Consistent with various aspects of the present disclosure, embodiments of the present disclosure may include a system, comprising a computing device with a display with an active display area, a computer memory configured to receive display data that includes page display instructions that specify how a plurality of portlets are to be displayed within a common page, and at least one processor. A processor may be configured to identify an initial portlet out of the plurality of portlets, remove portlets, other than the initial portlet, from the page display instructions to produce modified page display instructions having at least one transition instruction, and scale, based on the modified page display instructions, the initial portlet to render within the active display area. The processor may also be configured to render, based on the scaled initial portlet, a web page within the active display area.

Aspects of the present disclosure may be directed toward a computer program product for rendering portal pages within an active display area. The computer program product may comprise a computer readable storage medium having program instructions embodied therewith, the program instructions being readable and executable by a computing device to cause the computing device to perform a method. The method may include receiving display data that includes page display instructions that specify how a plurality of portlets are to be displayed within a common page and identifying an initial portlet of the plurality of portlets. The method may further comprise producing modified page display instructions by removing portlets, other than the initial portlet, from the original page display instructions; scaling, based upon the modified page display instructions, the initial portlet to render within the active display area; and rendering, based upon the scaled initial portlet, a web page within the active display area.

BRIEF DESCRIPTION OF THE SEVERAL VIEWS OF THE DRAWINGS

FIG. 1 shows a computer network populated by web page servers and page rendering devices, according to embodiments of the disclosure.

DETAILED DESCRIPTION

Figure 2:
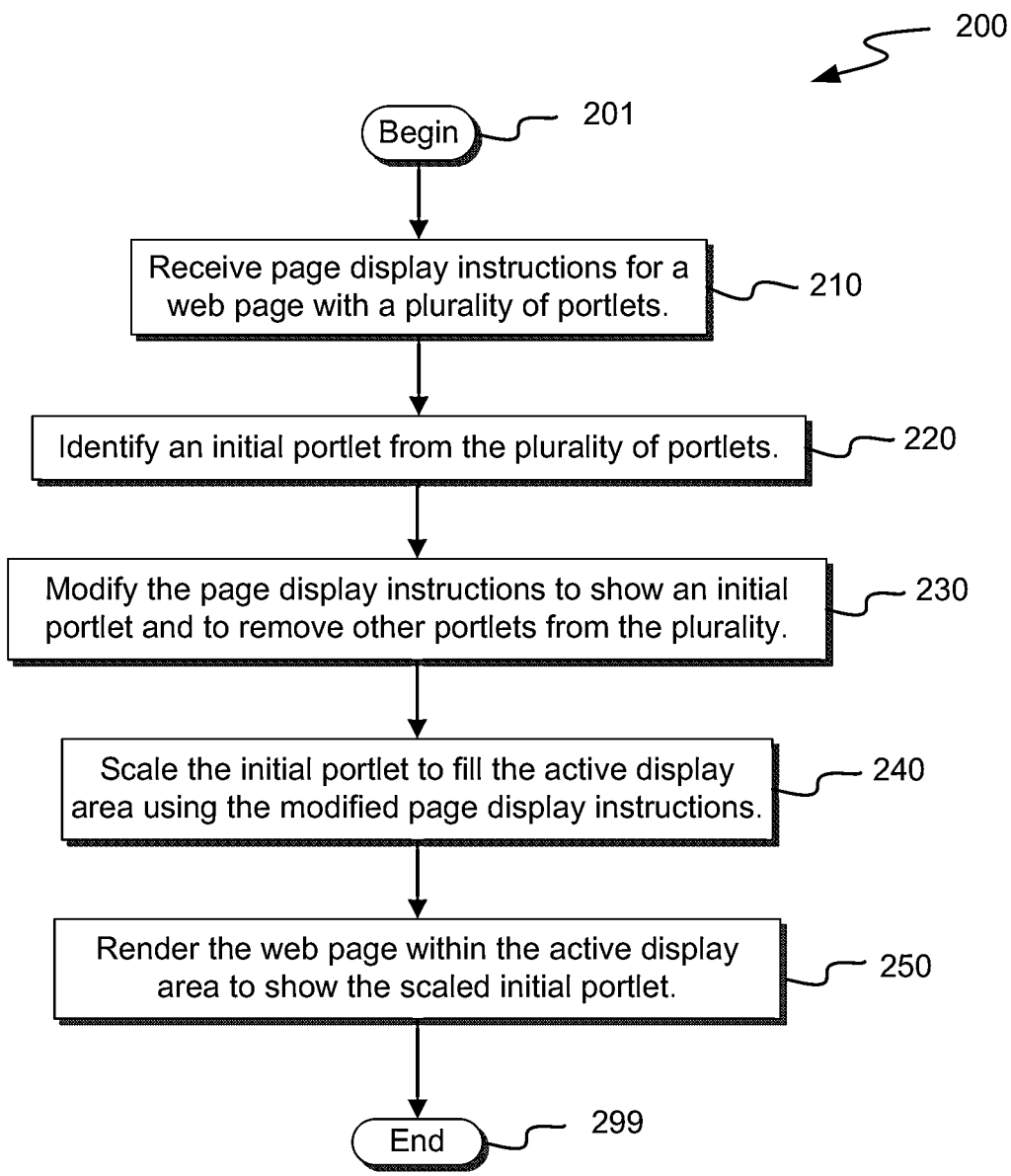
FIG. 2 describes a method of rendering web pages using modified web page display instructions, according to embodiments of the present disclosure.

Aspects of the present disclosure relate to the display of web page content on internet-connected devices, more particular aspects relate to rendering the content of web page frames or portlets on mobile devices such as tablet devices and smartphones, While the present disclosure is not necessarily limited to such applications, various aspects of the disclosure may be appreciated through a discussion of various examples using this context.

The modern internet includes large numbers of computer servers and networked personal computing devices that send and receive data over wired and wireless computer networks. Data may be transmitted across the internet at large or over smaller non-public computer networks. Personal computing devices such as desktop computers and a variety of portable computing devices such as laptop computers, tablet computing devices, and digital telephones including smartphones, may be attached to a computer network and submit requests for data such as web pages to remote computer servers. When the personal computing device receives a web page such as a portal page over the computer network, the page may include both page content (or page data) as well as page display instructions that regulate how the personal computing device renders the web page on the display of personal computing device.

Aspects of the present disclosure are related to a recognition that some web pages may not render correctly or aesthetically on some personal computing devices, such as when elements of the web page are rendered too large to fit entirely within the active area of the computing device display. For instance, mobile computing devices can have limited display areas of varying sizes and capabilities. Some web pages may contain multiple portlets that can be distributed over the web page according to page display instructions. Sometimes page display instructions may position page elements in a crowded manner within the display active area, making it difficult to read or interact with the page elements. Problems of improperly sized or crowded web page elements may occur on computing devices with physically small displays or displays with low pixel count or low resolution.

Various embodiments are directed toward a method of displaying a portal page within an active display area of a (mobile) computing device such as a smartphone or tablet computer. The mobile computer device can receive display data that includes a set of original page display instructions. The original page display instructions can specify how to display a plurality of portlets within a common page. The mobile computing device can identify an initial portlet of the plurality of portlets. For instance, the mobile computing device can select an initial portlet by identifying a portlet that the instructions indicate should be displayed in the top position of the common page. The mobile computing device can then remove portlets, other than the initial portlet, from the original page display instructions to produce modified page display instructions. The mobile computing device can also include at least one transition instruction in the modified page display instructions. This transition instruction can specify how the mobile computing device will transition between displaying the initial portlet and at least one of the other portlets. The mobile computing device can then scale, based upon the modified page display instructions, the initial portlet relative to the active display area of the mobile computing device. Based on the scaled initial portlet, a web page can then be rendered within the active display area.

FIG. 1 shows a computer network 100 with servers and other computing devices connected to each other. Computer servers 110 such as an email server 116 or a web page server 117 may be connected to computer network 100 to receive requests from networked computing devices 130. Networked computing devices 130 may include a desktop computer 141, and portable computing devices such as laptop computers 142, tablet computing devices 143 and digital telephones 144, including smartphones. A networked computing device such as a tablet computing device 143 may request a web page from a web page server 117 over a computer network 100 using a data request 160. Web page server 117 may then send data responses 165 across the computer network 100 to tablet computing device 143. Tablet computing device 143 may have web browsing software or other computer program products configured to render the web page data contained in the data response 165. The rendered web page may be displayed on the active area of the device display.

Web pages may include both page data and page display instructions. Page content may include numerical data, text, digital images, sound recordings, hyperlinks (to other web pages or other locations within the web page), as well as regions designed to receive entered data which may operate on the web page content or which may be transmitted back to computer servers. Other page regions, such as buttons or tabs, may trigger action on the web page, or a request for a new web page, when they are selected as by clicking a mouse button when the screen cursor is positioned over the button. These page regions take space in the active area that might otherwise be used to show web page content. When a web page is shown on a small display or a display with low resolution, the page content may be crowded or unaesthetically positioned or rendered too small to be easily viewed. Aspects of the present disclosure are directed toward providing a simplified display by modifying the original page display instructions that direct how the web page is displayed. For example, the page display instructions can be modified by removing portlets front the instructions and configuring the instructions to specify how to render the remaining portlet(s) as a single page.

FIG. 2 describes a method 200 of receiving and rendering web pages on portable computing devices. The method begins in block 201. The computing device, such as the computing devices mentioned in FIG. 1, may receive original page display instructions and page data for a web page having a plurality of portlets, as shown in block 210. When a web page or portal page is rendered according to the original page display instructions received with the web page from a computer server, the portlet user interface or window may be displayed some distance down from the upper edge of the device display active area. The topmost parts of the web page or portal page may be filled with a page banner or an advertising banner. There may also be page navigation controls associated with web browsing software displayed in an upper portion of the portal page, shifting portlets and other web page content toward the lower portion of the display active area. Other page content may compete with portlets to further shift page content around on the display active, including toward the bottom of the display active area. When this other page content is present, portlets are not displayed within the full display active area, which may make them difficult to read.

Rather than render the original page display instructions in a first mode to distribute the plurality of portlets across the display active area according to its size and orientation, the computing device may modify the original page display instructions in order to render the web page in a more aesthetic manner.

In the method the device may identify an initial portlet out of a plurality of portlets included in the web page data in order to produce modified page display instructions, as shown in block 220. The web page display instructions may specify a preferred portlet or an initial portlet, or the computing device may be preconfigured to interpret web page display instructions in order to select the initial portlet. Selection criteria for the initial portlet may include portlet size, the order the portlets are referred to in the original page display instructions, or a popularity metric such as the number of times a portlet is selected for viewing or a social networking referral count.

The original page display instructions may be modified to include the initial portlet and to remove all other portlets from the plurality of portlets, creating modified page display instructions, as described in block 230. The original page display instructions may be retained to produce further sets of modified page display instructions.

After selection, the initial portlet may be scaled in order to fill the active display area on the portable computing device using the modified page display instructions, as described in block 240. Finally, after scaling, the web page may be rendered within the active display area to show the scaled initial portlet as described in block 250. A processor circuit may be configured to render the web page based on the modified page instructions. In some embodiments, a computer system may contain a first processor circuit that performs general-purpose computations for the system and a discrete second processor circuit that specializes in rendering data to be shown on the computing system display active area. Other embodiments may have a single chip that contains both the general-purpose processor circuit and the specialized second processor circuit for graphical rendering. Further embodiments may contain only a single processor circuit that performs both general-purpose and graphical rendering functions.

The modified page display instructions may direct the computing device to show the portlet in a full-screen zoom mode or a headless browser mode. The scaled portlet, when rendered in the headless browser mode or in the full-screen zoom mode, may completely fill up the active area of the computing device display. The page rendering software, whether a web browser or some other page rendering software, may render the portal page with no theme. The headless browser mode may include just the initial portlet in a solo mode with no other visible web page content. Alternatively, some web page elements may be retained in the modified page display instructions to assist in web page navigation. In some embodiments of the present disclosure, the headless browser mode or the full-screen zoom mode may also include an indicator of the number of portlets available on the original web page. The method ends in block 299.

The modified page display instructions that produce a web page in full-screen zoom mode or headless browser mode may include one or more transition instructions that instruct the computing device on how to display a second web page upon performance of a triggering action. Available transition actions may include a zoom mode transition action (activating transition instructions that change the web page between full-screen zoom mode and a windowed mode showing all the plurality of portlets in the web page), and a portlet transition action (activating transition instructions that change the web page between the full-screen zoom mode with the initial portlet and the full-screen zoom mode with a second portlet), and a browser mode transition action (activating transition instructions that change the web page between the headless browser mode and a windowed mode showing all the plurality of portlets, or a page index mode where portlets are replaced by hyperlinks to the portlet content). Transition instructions may also rotate the web page content based upon an orientation change action, such as rotating a smartphone or a tablet computing device from a landscape or widescreen orientation to a portrait orientation.

Figure 3:
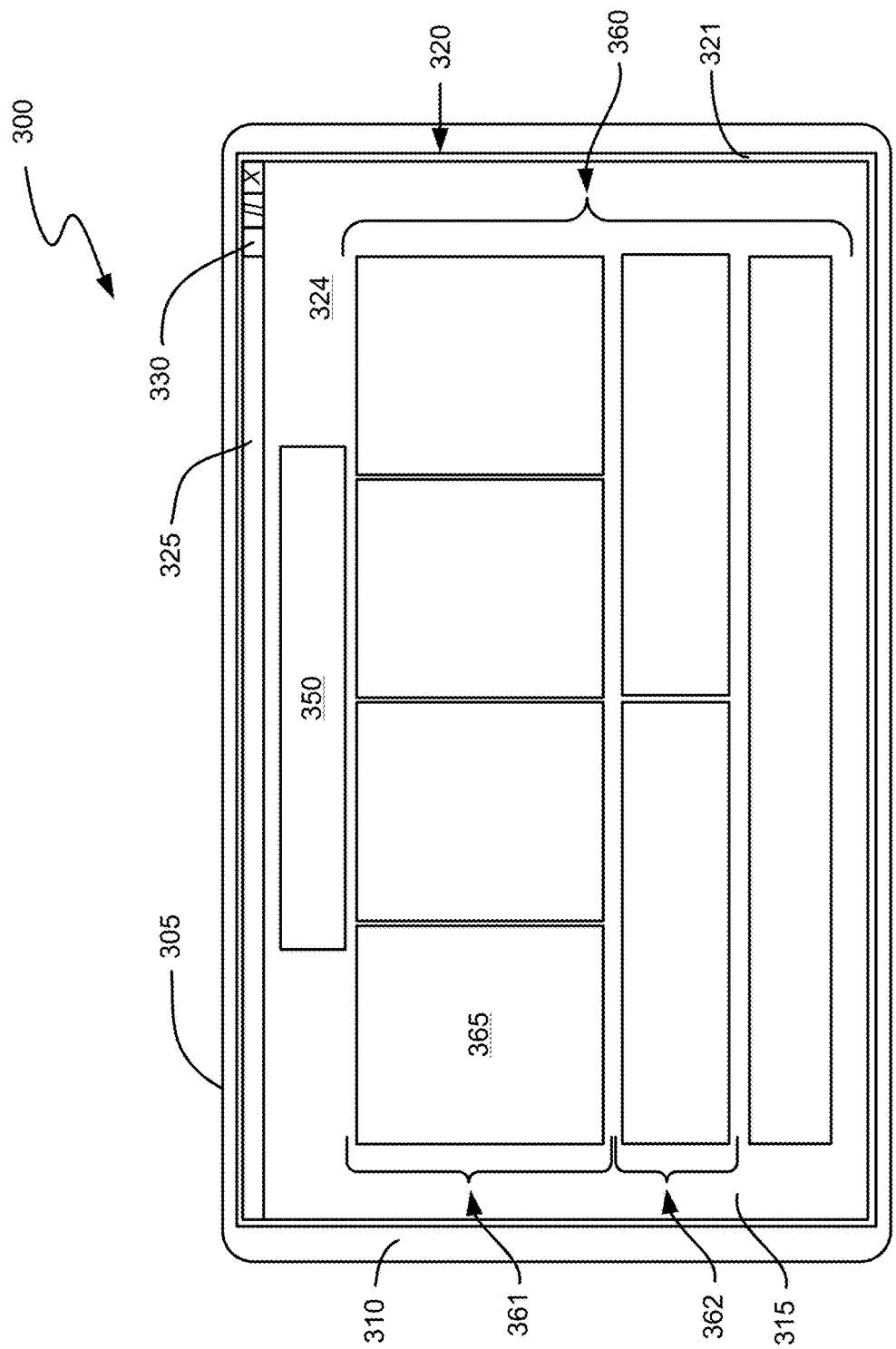
FIG. 3 shows a web page rendered on a widescreen computing device with a page header and multiple horizontally-arranged portlets, according to aspects of the disclosure.

FIG. 3 portrays a web page rendered by a computing device onto a display 300. The web page is rendered in a first mode containing the plurality of portlets in the original page display instructions. The display 300 has a display edge 305 and a display bezel 310. The operating system and web browser software may draw a programming window 320 with a window border 321, a window header bar 325, and window control buttons 330. A web page 324 may be displayed within the program window 320. The program window 320 may fill the active area 315 of the display 300 in some embodiments.

The web page 324 may contain a header 350 and a plurality of portlets 360 that may be arranged into a first row 361 and a second row 362. Other embodiments of rendered web pages may contain similarly sized portlets arranged in columns or grids. Display 300 is shown with a widescreen orientation. When a computing device has a portrait-oriented display rather than a widescreen display the header 350, the plurality of portlets 360 may be arranged in other patterns within the active area 315 according to the web page's original page display instructions. The first mode described may be rendered to show each of the plurality of portlets 360 on the web page, and may be the initial mode in which the web page is rendered on the display 300. The original web page may be displayed in alternative modes by modifying the original page display instructions to reduce the number of displayed web page elements. The original page display instructions may identify an initial portlet 365 that can be rendered in a first or highly prominent position on the web page.

For example, large displays, or displays with high pixel densities, may devote a high proportion of the display active area 315 to rendering the web page 324 and a relatively small proportion of the active area 315 to rendering the window header bar 325, window control buttons 330, the window border 321, or other graphical elements of a computer program or operating system. Web page 324 may be more accurately rendered on a large or high-resolution display than on a physically small or low-resolution display because there may be more physical screen area or pixels available to show the rendered web page. On some physically small, high resolution displays, some page display instructions may cause a web page to display portlets in a manner too small to easily read, especially for persons with poor eyesight. Aspects of the present disclosure are directed toward modifying the original page display instructions to create modified page display instructions that can cause a computing device to render individual portlets from a web page. This can be useful for presenting images and data in a more accessible and easy-to-read manner.

Figure 4:
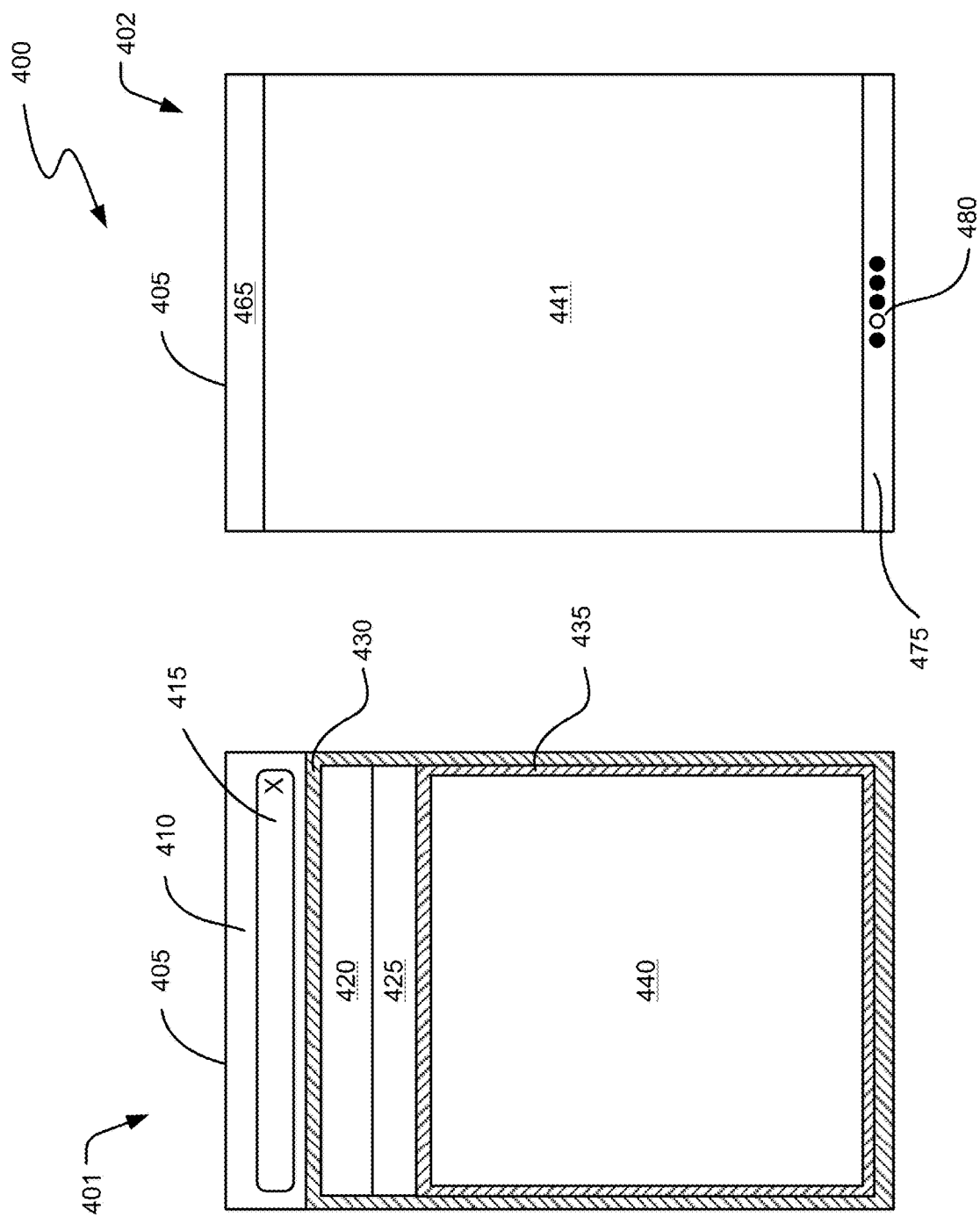
FIG. 4 shows modes of rendering a web page on a mobile computing device display with different zoom characteristics, according to aspects of the present disclosure.

FIG. 4 shows zoom modes 400 of rendering a web page according to embodiments of the present disclosure. Rather than display the original web page in the first mode, as described and demonstrated above in FIG. 3, the original page display instructions may be modified before rendering them to produce modified page display instructions that, when rendered, produce a second mode of displaying the web page. The second mode may be a simplified version of the web page containing fewer page elements. When the original page display instructions may be rendered onto the small display active area 405 of a mobile computing device such as a smartphone, the page may contain page elements that crowd an initial portlet 440 (e.g., a portlet similar to the initial portlet 365 of FIG. 3).

For example, a page rendered in the first mode 401 may include within the display active area 405 a header bar 410 for the operating system, an address bar 415 for navigating web pages using web browsing software, a web browser menu region 420, a page header 425 for the web page being rendered on the display, a window border 430, a portlet border 435, and an initial portlet 440. Alternative embodiments of a web page rendered in the first mode 401 may also include all of the plurality of portlets included with the original page display instructions for the web page, even though portlets other than the initial portlet may be visible only on larger-screened devices or upon scrolling the web page. Inclusion of operating system and browser window elements may have the effect of reducing the amount of space available to view the initial portlet 440 in the display active area 405. In addition to the operating system and browser window elements, web page elements may be portrayed according to a theme specified in the page display instructions that also allocates part of the display active area 405 for thematic elements.

Web pages may be designed with a theme to make the content of the page harmonious with other web pages and to make the web page attractive and easy to read. Page display instructions are a form of computer code or a markup language that provides a web browser or another rendering program with instructions on how to display the page content of a portal page or web page. Page display instructions may be written in several possible forms, including Javascript language instructions and cascading style sheets and other application programming interfaces (APIs). Cascading style sheets are an element of page display instructions that allow for creating and showing styles, including fonts, colors, and spacing, to web pages for subsequent rendering on computing devices. Cascading style sheets allow a rendering program like a web browser to control the appearance of documents written in markup languages by providing a set of structured commands that control the formatting, appearance, and layout of web page text and graphics. Cascading style sheets may have the effect of rendering web pages in a consistent manner across multiple display sizes and different types of devices.

Cascading style sheets may further control the size or zoom factor of web page components or of entire web pages. Many APIs contain commands that allow a requesting computing device (one that requests a web page) to reveal the size of a display on which the page may be rendered. The cascading style sheet downloaded from a server may be tailored to suit the display on the requesting device. The web tailoring, to produce modified page display instructions, may alternatively be performed by the computer server or by the device that receives the requested web page. For example, the jquery mobile API contains a variable called "device-width" that allows the rendering program or web browser to adjust the width of the displayed page content according to the width of the device, with some provisions for additional scaling of the page content received and rendered by the device by setting an "initial-scale" variable.

APIs such as dojo mobile may include commands that facilitate building themes for presenting page content and configuring user interaction modes. Portable computing devices may contain touch-sensitive displays that may respond to a screen touch action by a finger or s stylus, a screen swipe gesture with one or more fingers, verbal commands, button depression on the front or side of the computing device, and the selection of hypertext link with a touch or a gesture. Portable computing devices may also respond to gestures, touches, or verbal commands to navigate through web browser, to open and close programs on the computing device, or that act as zoom transition commands to zoom into or zoom out of images on web pages.

A web page may be designed to include JavaScript and CSS page display instructions to display page content on a portable computing device screen. When a portable computing device renders a web page it may include operating system and window elements similar to those of a page rendered on a widescreen display computing device. Further, JavaScript and CSS in appropriately modified page display instructions may allow a web page may to be initially rendered in a full-screen zoom mode 402 in the display active area 405 to show the content of the scaled initial portlet 441 on a larger fraction of the display active area 405.

The scaled initial portlet 441 may contain the same content as the initial portlet 440 rendered in the first mode, but be presented in a simplified or streamlined manner with fewer operating system, browser window, and web page elements to permit the (e.g.) web browsing software to render the scaled initial portlet in a maximum of screen area. Full-screen zoom mode 402 may include only the scaled initial portlet 441, excluding all other elements of first mode 401. The header bar 410 for the device and operating system may optionally be included or excluded from rendering during full-screen zoom mode 402. A web page may be toggled between the full-screen zoom mode 402 and the first mode 401 by performing a zoom mode transition action that activates a transition instruction built into the modified page display instructions. The zoom mode transition action may be a screen touch action, a screen swipe gesture, a verbal command, or the selection of a hyperlink.

A portlet selector region 475 in full-screen zoom mode 402 may include a series of graphically-represented portlet links 480 or hyperlinks that can cause the rendering program or web browser to change which portlet or other content is rendered in the display. A portlet transition action such as a screen touch action, a screen swipe gesture, a verbal command, a button depression, or selection of a hyperlink in the portlet selector region 475 may cause the computing device to transition from the scaled initial portlet 440 to a scaled second portlet 441, also in full-screen zoom mode. This may be accomplished by performing a portlet transition action that may cause the computing device to select a second portlet from the original page display instructions, remove the other portlets from the original page display instructions to create second modified page display instructions, scale the second portlet to fill the display area, and render the second web page according to the second modified page display instructions.

Zoom mode transition actions and portlet transition actions may be selected from common categories, but trigger different instructions. For example, twice-tapping a touch-sensitive tablet computing device screen may trigger both the exit from and entry to full-screen zoom mode. Structurally similar gestures, such as spreading fingers apart or pinching fingers together while in contact with a touch-sensitive smartphone display may cause a web browser showing a web page in full-screen zoom mode to exit and enter, respectively, the full-screen zoom mode. The shape of the gestures across the display of a computing device, such as a tablet computing device, may be similar, but they may be created by converging or diverging finger motions across the display surface. Swiping one or more fingers across the display may trigger a portlet transition instruction when the device is in full-screen zoom mode, but scroll a web page when the browser displays the web page in the first mode. On appropriately configured computing devices, such as tablet computing devices or smartphones, vocal commands may direct the web browser program trigger the zoom transition or portlet transition instructions.

Figure 5:
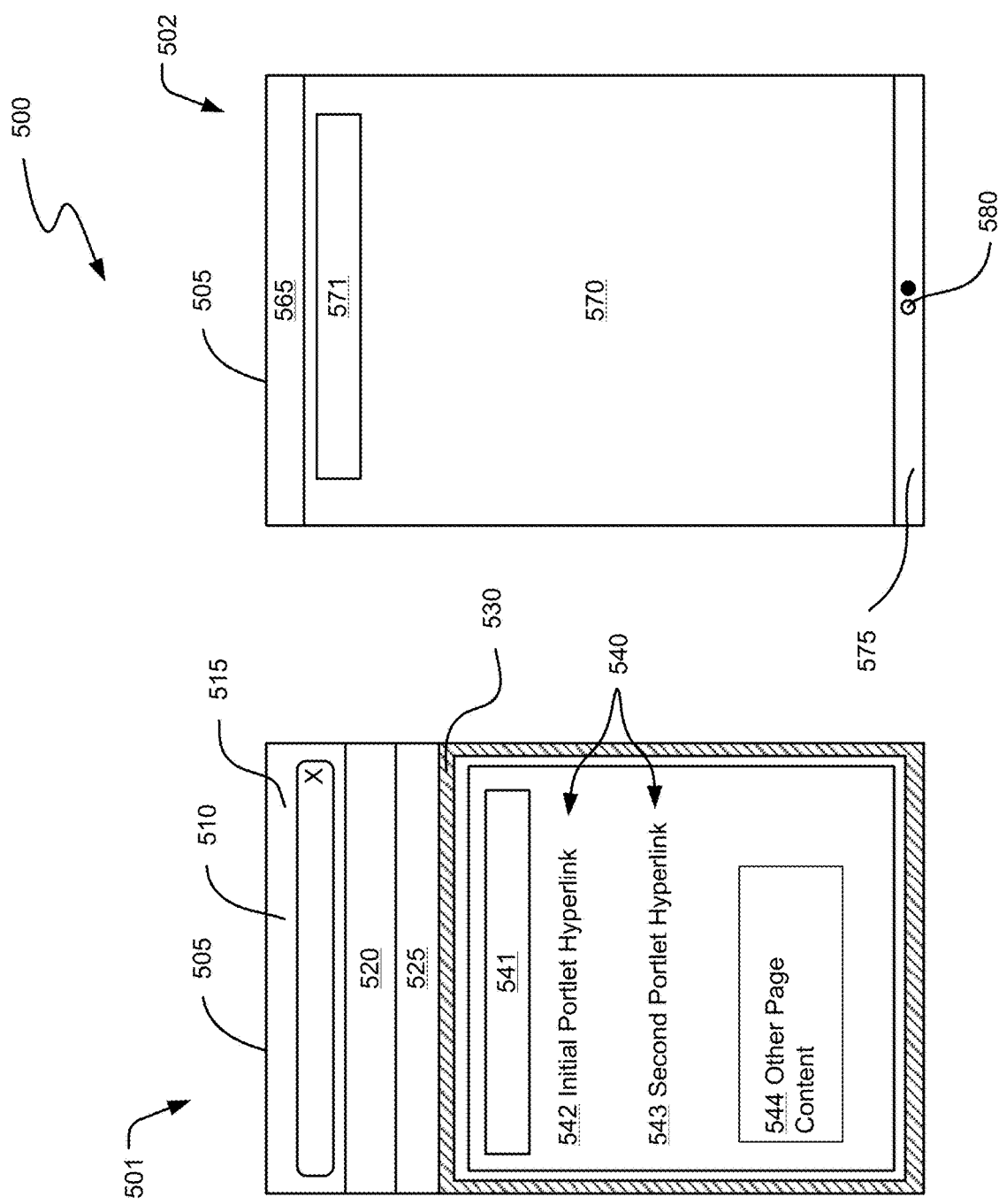
FIG. 5 shows alternative modes of rendering a web page on a mobile computing device display, a normal page rendering mode and headless browser mode with hypertext links, according to embodiments of the invention.

FIG. 5 shows further alternative modes 500 of rendering a web page according to embodiments of the disclosure. A web page may be configured to render in the first mode described above in FIG. 3, or in a page index view mode 501 where the content of each portlet has been replaced by a hypertext link that can cause the web browsing software to render the associated portlet after being selected. The first mode described in FIG. 3 may be rendered based on the original page display instructions, while the page index view mode 501 may be rendered based on modified page display instructions that replace each of the plurality of portlets with a descriptive hyperlink that identifies the linked portlet. The page index view mode 501 may include many elements of a window and the web page in the display active area 505, such as a display header bar 510, an address bar 515, a browser menu region 520, a web page header 525, a window border 530, and a hyperlink index 540 on the web page itself. Hyperlink index 540 may include a page title 541, an initial portlet hyperlink 542, and a second portlet hyperlink 543, and other page content 544. A web page may also be configured to render in a headless browser mode 502. The headless browser mode 502 may be selected as a default mode for rendering the web page, or it may be entered upon performance of a browser mode transition action such as selecting a descriptive hyperlink that identifies a portlet, such as the first portlet hyperlink 542.

In headless browser mode, non-portlet web page content is cleared from the display active area 505 and the scaled initial portlet 570 is scaled to fill the available display active area 505 upon being rendered to the device display. The scaled initial portlet 570 may be have the same content as the scaled initial portlet 441 of FIG. 4, or the initial portlet 365 of FIG. 3. The modified page display instructions used to create the headless browser mode 502 of a web page may include transition instructions to enter and exit the headless browser mode 502. Browser mode toggle actions such as a screen touch action, a screen swipe gesture, a verbal command, and a button depression may activate the browser mode transition instructions included with the associated modified page display instructions.

In headless browser mode 502, the active area 505 may also contain elements such as a device header bar 565 having icons and text that may indicate device wireless connectivity status, wireless signal strength, device power status (charging, discharging, power level), device identification information, device telephone number, or other device-centric information. A return hyperlink 571 may also be displayed at the top of the display active area 505 or elsewhere within the scaled initial portlet 570 to permit a user to return to page index view mode 501 upon selection of the index-return hyperlink 571 with a touch or use of a pointing device.

Display active area 505 may also contain a portlet selector region 575 when rendering a portlet in headless browser mode 502, where the portlet selector region 575 indicates the number of portlets available as a sequence of graphical hyperlinks within the region. Portlet selector region 575 may also permit navigation between portlets by performance of a portlet transition action such as a screen swipe gesture, a screen touch gesture, a verbal command, a button depression, and selection of a hyperlink, where the hyperlinks are the portlet selector region 575 visual indicators of the number of portlets on the web page. Portlet selector region 575 and the device header bar 565 may be significantly smaller than portlet 570 in order to increase the proportion of display active area 505 that may be used to render the portlet 570 contents.

Referring to the FIGS. and discussion, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments herein.

What is claimed is:

1. A mobile device, comprising:
    a display with an active display area;
    a computer memory configured to receive display data that includes original page display instructions that specify how a plurality of portlets are to be displayed within a common page, wherein the original page display instructions are configured to cause the mobile device to render the common page on the display before rendering any individual portlet of the plurality of portlets separately from the common page; and
    at least one processor circuit communicatively connected to the display and the computer memory and configured to:
        identify an initial portlet of the plurality of portlets by analyzing the original page display instructions, wherein analyzing the original page display instructions does not require user input,
        automatically produce, based on the analysis of the original page display instructions, modified page display instructions having a first transition instruction by removing portlets, other than the initial portlet, from the original page display instructions, wherein the first transition instruction specifies how the at least one processor circuit will transition between displaying the initial portlet and at least one other portlet,
        automatically scale, based on the modified page display instructions, the initial portlet to render the initial portlet full-screen within the active display area,
        automatically render, based on the scaled initial portlet, a web page within the active display area, wherein the rendered web page includes the scaled initial portlet without other portlets and separately from the common page, and wherein the common page is not rendered on the display prior to the rendered web page.

2. A computer program product for rendering portal pages within an active display area, the computer program product comprising a computer readable storage medium having program instructions embodied therewith, the program instructions being readable and executable by a computing device to cause the computing device to perform a method comprising:
    receiving display data that includes original page display instructions that specify how a plurality of portlets are to be displayed within a common page, wherein the original page display instructions are configured to cause the computing device to render the common page within the active display area before rendering any individual portlet of the plurality of portlets separately from the common page;
    identifying an initial portlet of the plurality of portlets by analyzing the original page display instructions, wherein analyzing the original page display instructions does not require user input;
    automatically producing, based on the analysis of the original page display instructions, modified page display instructions by removing portlets, other than the initial portlet, from the original page display instructions;
    automatically scaling, based upon the modified page display instructions, the initial portlet to render within the active display area; and
    automatically rendering, based upon the scaled initial portlet, a web page within the active display area, wherein the rendered web page includes the scaled initial portlet without other portlets, and wherein the common page is not rendered within the active display area prior to the rendered web page.

3. The computer program product of claim 2, wherein the computing device is selected from the group consisting of: a digital telephone, a tablet computing device, a handheld computing device, and a laptop computer.

4. The computer program product of claim 3, wherein the method further comprises:
    identifying a second portlet of the plurality of portlets;
    removing portlets, other than the second portlet, from the page display instructions to produce second modified page display instructions having at least one transition instruction;
    scaling, based upon the second modified page display instructions, the second portlet to render with the active display; and
    rendering, based upon the scaled second portlet, a second web page within the active display area upon performance of a portlet transition action.

5. The mobile device of claim 1, wherein the at least one processor circuit is further configured to:

receive, while depicting the rendered web page on the display, a touch gesture from a user via the display, and render, in response to the received touch gesture and based on the first transition instruction, a second web page within the active display area, wherein the rendered second web page includes a second portlet of the plurality of portlets without other portlets, and wherein the common page is not rendered on the display prior to the rendered second web page.

6. The mobile device of claim 1, wherein the original page display instructions are not configured to allow the mobile device to render any individual portlet of the plurality of portlets separately from the common page on the display before first rendering the common page.

7. The mobile device of claim 1, wherein the original page display instructions are configured to require the mobile device to render the common page on the display before rendering any individual portlet of the plurality of portlets separately from the common page.

8. The mobile device of claim 1, wherein the at least one processor circuit is further configured to:

compare, based on a popularity metric, popularities of the plurality of portlets, and select, based on the comparison, a particular portlet as the initial portlet.

9. The mobile device of claim 8, wherein the popularity metric is a number of times a portlet is selected for viewing.

10. The mobile device of claim 8, wherein the popularity metric is a social networking referral count for a portlet.

11. The mobile device of claim 1, wherein the at least one processor circuit is further configured to:

identify, based on the analysis of the original page display instructions, a second portlet of the plurality of portlets, automatically produce, based on the analysis of the original page display instructions, further modified page display instructions having a second transition instruction by removing portlets, other than the second portlet, from the original page display instructions, wherein the second transition instruction specifies how the at least one processor circuit will transition between displaying the second portlet and the initial portlet, automatically scale, based on the further modified page display instructions, the second portlet to render the second portlet full-screen within the active display area, and render, based on the scaled second portlet and in response to a toggle action received via the display while the display is depicting the web page, a second web page within the active display area, wherein the rendered second web page includes the scaled second portlet without other portlets.

12. The computer program product of claim 2, wherein the method further comprises:

identifying a second portlet of the plurality of portlets to scale by analyzing the original page display instructions;

producing further modified page display instructions by removing the initial portlet and adding the second portlet from the original page display instructions;

scaling, based upon the further modified page display instructions, the second portlet to render within the active display area; and rendering, based upon the scaled second portlet, a second web page within the active display area, wherein the rendered second web page includes the scaled second portlet without other portlets, and wherein the common page is not rendered on within the active display area prior to the rendered second web page.

13. The computer program product of claim 2, wherein the original page display instructions are not configured to allow the computing device to render any individual portlet of the plurality of portlets separately from the common page within the active display area before first rendering the common page.

14. The computer program product of claim 2, wherein the original page display instructions are configured to require the computing device to render the common page within the active display area before rendering any individual portlet of the plurality of portlets separately from the common page within in the active display area.

15. The computer program product of claim 2, wherein the method further comprises:

comparing, based on a popularity metric, popularities of the plurality of portlets, and selecting, based on the comparison, a particular portlet as the initial portlet.

16. The computer program product of claim 15, wherein the popularity metric is a number of times a portlet is selected for viewing.

17. The computer program product of claim 15, wherein the popularity metric is a social networking referral count for a portlet.

* * * * *